United States Patent
Alexander et al.

(10) Patent No.: US 11,948,100 B2
(45) Date of Patent: Apr. 2, 2024

(54) SOFTWARE CATEGORIZATION BASED ON KNOWLEDGE GRAPH AND MACHINE LEARNING TECHNIQUES

(71) Applicant: Microsoft Technology Licensing, LLC, Redmond, WA (US)

(72) Inventors: Daniela Alexander, Bellevue, WA (US); Ahsanul Haque, Bellevue, WA (US); Rajesh Shashikant Korde, Sammamish, WA (US); Minglei Huang, Bothell, WA (US); Rui Zhu, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/936,453

(22) Filed: Sep. 29, 2022

(65) Prior Publication Data
US 2023/0108446 A1  Apr. 6, 2023

Related U.S. Application Data

(63) Continuation of application No. 16/869,347, filed on May 7, 2020, now Pat. No. 11,481,648.

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,838,843 B1* | 12/2017 | Bajaj | H04W 4/022 |
| 2018/0144270 A1* | 5/2018 | Wilson | G06N 5/022 |
| 2018/0188900 A1* | 7/2018 | Gupta | G09G 5/32 |
| 2018/0227352 A1* | 8/2018 | Ortiz | H04L 67/125 |
| 2019/0384911 A1* | 12/2019 | Caspi | G06N 20/00 |
| 2020/0044938 A1* | 2/2020 | Dias | G06F 9/5044 |
| 2020/0341943 A1* | 10/2020 | Sarkar | G06F 16/156 |
| 2021/0157595 A1* | 5/2021 | Rouse | G06F 9/3836 |
| 2021/0256680 A1* | 8/2021 | Xie | G06V 10/82 |
| 2021/0321872 A1* | 10/2021 | Saphier | G16H 30/40 |

* cited by examiner

*Primary Examiner* — Toan H Vu
(74) *Attorney, Agent, or Firm* — Weaver IP L.L.C.

(57) ABSTRACT

Methods and systems are provided for determining the category of a software application utilizing machine learning (ML) and knowledge graph techniques, and for controlling access to the application by a user based on the category and configured time restrictions for the user. The system includes a feature set extractor and a category predictor with a trained ML model. The trained ML model generates the category of the application based on a feature(s) of the application. The generated category is indicated in a data structure. An access request handler receives a request related to access to the application from a user device. A category determiner determines the category of the application from the data structure. A time usage manager determines an available time usage for the category and the specified user. The access arbiter responds to the request from the user device with the available time usage.

20 Claims, 9 Drawing Sheets

SOFTWARE CATEGORIZATION BASED ON KNOWLEDGE GRAPH AND MACHINE LEARNING TECHNIQUES

CROSS-REFERENCE TO RELATED APPLICATION

This application is a continuation of and claims priority to pending U.S. patent application Ser. No. 16/869,347 entitled "SOFTWARE CATEGORIZATION BASED ON KNOWLEDGE GRAPH AND MACHINE LEARNING TECHNIQUES," which was filed on May 7, 2020, and is herein incorporated by reference in its entirety

BACKGROUND

Some software platforms have features aimed at simplifying a family's use of electronic devices. For example, family accounts may provide various settings for protecting children from viewing inappropriate content or for supervising their use of software applications. In some cases, parents may wish to limit the amount of time a child can spend on a certain type of software (e.g., to limit time spent playing games, interacting on social media, or watching online entertainment). For example, a parent may wish to allow their children to spend unlimited time using educational and navigation software while restricting their time spent on social media.

In general, a software application may fall into a certain category (e.g. games, entertainment, social networking, education, productivity, navigation, health, or browsers). Sometimes the category of an application is provided as metadata with the purchase of the application. For example, when an application is sold via a software distribution marketplace (e.g. the App Store® provided by Apple Inc. of Cupertino, California), it may include some form of an application description and/or a category of the application. However, software applications that are downloaded directly from their creators (e.g., native Windows® applications utilizing Win32®) may not be assigned a clear category, or their creators may classify them inaccurately. In these cases, the software applications may be categorized manually.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided for determining a category of a software application utilizing machine learning and knowledge graph techniques. As such, access to the application by a user may be controlled based on the category of the application and application category time restrictions of a user. A feature set extractor is configured to identify at least one feature of an application. A category predictor includes a trained machine learning model. The category predictor is configured to generate, by the trained machine learning model, a category of the application based on the at least one feature of the application. The category predictor indicates the generated category in a data structure that indicates application categories.

A system may further include an access request handler having an access arbiter that is configured to receive a request related to access to the application by the specified user. A category determiner is configured to determine the category of the application from the data structure. A time usage manager is configured to determine the available time usage that corresponds to the category of the application for a specified user. The access arbiter is further configured to respond to the request with a determined available time usage, which corresponds to the category of the application for the specified user.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
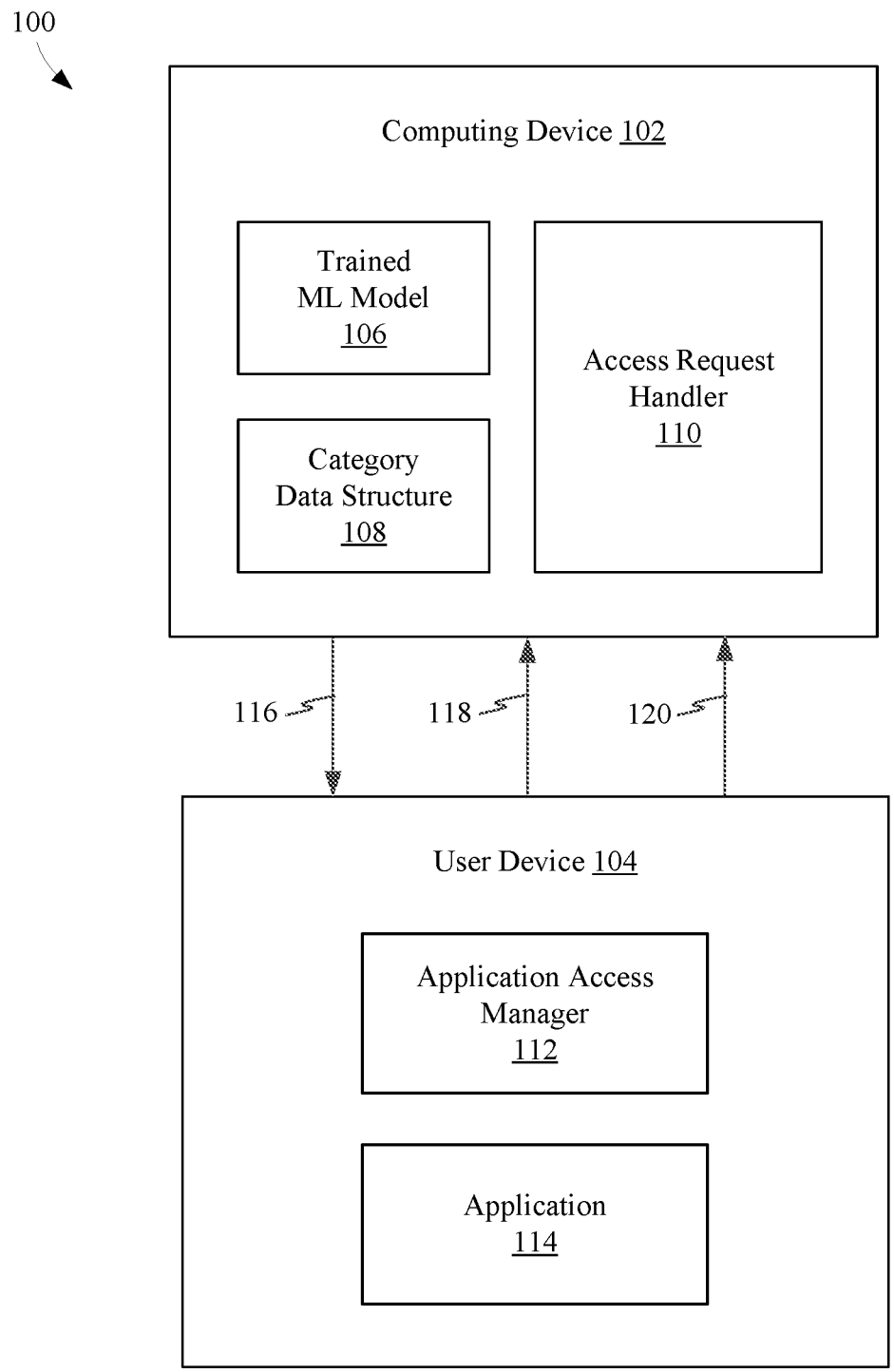
FIG. 1 is a block diagram of a system for determining the category of a software application utilizing machine learning and knowledge graph techniques, and for controlling user access to the application based on the category, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Software applications may be associated with various metadata and the metadata may be utilized to control access to the applications. For example, an application may be associated with, among other things, a name and/or identifier, a description, a category, a publisher, or a size of the application. As described above, the category of an application may be provided with the purchase of the application. When the application is sold via a software distribution marketplace (e.g. the App Store®), it may include an application name and/or identifier, some form of a description, and/or a category of the application. However, software applications that are downloaded directly from their creators (e.g., native Microsoft Windows® applications utilizing Win32® platform) may not be assigned a clear category, or their creators may classify them inaccurately. In this case, electronic systems cannot distinguish the category of the application based on the downloaded software. Software applications may be categorized manually using rule-based methods (e.g., applications with similar names or similar publishers, etc.), and human input may be used to apply the category labels. However, this type of categorization solution does not scale-up to meet software categorization demands on the order of hundreds to thousands of new applications per day.

According to embodiments, a scalable machine learning solution is provided that can handle the high quantity of new applications encountered per day and the lack of category labels at install time. In some embodiments, a learning model, such as a bidirectional encoder representations from transformers (BERT) based deep learning solution, may use text features such as application names and/or descriptions to determine the category of an application. In some embodiments, images related to an application may be used to determine a category. Image features may be processed using various suitable deep learning techniques, such as, convolutional neural networks (CNN). Given the name or identifier of an application, its description may be found via a knowledge graph service. In some cases, the description may be translated to a desired language (e.g., to English), and text based machine learning may be applied to predict the application's category. In an example, an embodiment provides a high quality of categorization (e.g., accuracy of 97%, and F1 score of 0.92).

The category of a software application may be useful in software platforms that monitor or control access to applications for family members. In one example, features provided with an operating system enable parents to limit their children's access to and/or time spent with certain types or categories of applications. However, the category of a software application may also be utilized for other purposes and for any other kinds of users.

A system for determining a category of a software application, and for controlling access to the application based on its category, may include one or more devices. In one example, the system may have a client server architecture that spans multiple devices. In another example, a user device may include a system with both categorization and access control functionality.

Example embodiments for category determination and enabling application access are described as follows. For instance, FIG. 1 shows a block diagram that represents a system for determining the category of a software application utilizing machine learning and knowledge graph techniques, and for controlling user access to the application based on the category, according to an embodiment. Referring to FIG. 1, a system 100 is shown. System 100 includes a computing device 102 and a user device 104. Computing device 102 includes a trained machine learning model 106, a category data structure 108 and an access request handler 110. User device 104 includes an application access manager 112 and an application 114.

Computing device 102 is configured to receive a request related to access to an application 118 (i.e., request 118) from user device 104, and in response, transmit a determined available time usage response 116 (i.e., response 116) to user device 104. Computing device 102 also receives a time usage report 120 from user device 104. FIG. 1 is described in further detail as follows.

Computing device 102 and user device 104 may each include a computing device, such as a desktop computer, a server, a mobile device, or a video game console, etc. In some embodiments, computing device 102 includes a server that communicates with user device 104, which may act as a client device. User device 104 may be a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc. However, in some embodiments, the functionality of computing devices 102 and 104 may be included in a single device, thus eliminating a need for a second device.

A user may attempt to access application 114 on user device 104, and user device 104 may transmit a request related to access application 118 to computing device 102. Computing device 102 receives the request related to access to application 118 from user device 104, and in response, transmits a determined available time usage response 116 to user device 104. Computing device 102 may also receive time usage reports 120 from user device 104 periodically or otherwise while application 114 is running on user device 104.

Computing device 102 includes trained machine learning model 106, which is configured to receive feature sets (e.g., test data) relating to one or more software applications, determine a category for each of the one or more applications based on its features, and populate category data structure 108 with the determined categories and corresponding confidence scores. The confidence scores may indicate the probability that the determined category is correct. In this regard, a feature set that includes metadata associated with a software application is input to trained machine learning model 106. An exemplary feature set may include one or more of an application name, application description, images related to the usage of the application, publisher, size, or usage minutes, etc. In some embodiments, trained machine learning model 106 uses a feature set based on an application description to determine the category of the application. Various application categories may be defined for the output of trained machine learning model 106 to category data structure 108. For example, categories may include games, entertainment, social networking, education, productivity, tools, navigation, health, fitness, shopping, browsers, music players, photo sharing, instant messaging, video chat, multimedia, parenting, video players, shooter, sports, casino, role playing, etc.

Category data structure 108 may include, for example, a list of application names and/or application identifiers that are each associated with a corresponding category and a confidence score that are generated by the category predictor 214 (e.g., for applications utilizing Win32® platform). In some embodiments, category data structure 108 further includes applications with known or provided categories. For example, applications purchased from a software distribution marketplace (e.g. App Store®), such as, UWP (Universal Windows Platform), or Google Android™ applications that may include application category information when purchased. For applications that are not successfully handled by trained machine learning model 106, and for which the category is unknown, a category may be automatically determined by inference from a categorized application with a similar or same name and/or publisher. Also, in some embodiments, a user, such as a developer or account administrator (e.g., a parent) may manually enter or replace a category of an application in category data structure 108. Category data structure 108 may be updated periodically or when one or more new application metadata feature sets becomes available.

Access request handler 110 is configured to provide information to user device 104 so that user device 104 can enforce access restrictions for a user attempting to access applications that run on user device 104 or on other user devices. For example, when the user attempts to launch, or continue to access an already running, application 114 (e.g., Facebook®, Microsoft Bing®, Animal Crossing®, etc.) on user device 104, user device 104 generates and transmits a request 118 related to access of application 114 that is received by access request handler 110. Request 118 related to access to an application 114 may include the name and/or and an identifier of application 114 and the name and/or an identifier of the user attempting to launch application 114. In response to request 118, access request handler 110 is configured to determine an available time usage corresponding to the category of application 114 based on (1) a machine learning determined category of application 114, which is retrieved from category data structure 108, (2) access restrictions that are configured for the user for one or more application categories, and (3) accumulated time usage relating to the category of application 114 for the user. Computing device 102 transmits, to user device 104, an available time usage response 116, which indicates the remaining amount of time that the user is allowed to access application 114 or any other application of the same category. User device 104 may be configured to transmit a request 118 related to the application 114 periodically to computing device 102 while the user is logged into and/or using application 114. In response, the access request handler is configured to return an available time usage response 116 to user device 104 indicate remaining time usage available for the user on application 114 and/or the category of application 114. In some embodiments, the term user or particular user may refer to a plurality of users.

Application access manager 112 of user device 104 is configured to enforce the available time usage limits that are provided in an available time usage response 116 transmission from computing device 102. For example, as indicated above, when a user attempts to access application 114 or while the user continues to use application 114, application access manager 112 transmits request 118 related to access to an application 114 to computing device 102. Request 118 may include (1) the name and/or and an identifier of application 114, and (2) the name and/or an identifier of the user attempting to launch the application.

Application access manager 112 is configured to receive the available time usage response 116 in response to request 118. The available time usage response 116 indicates the remaining amount of time that the user is allowed to access application 114. The response 116 may be determined based on user restrictions configured for the category of application 114 and the user's accumulated time for the category of the application. Application access manager 112 is configured to determine the remaining time usage and perform an action based on the results if deemed appropriate. The action may include, for example, allowing the user to launch application 114, denying access to application 114, deactivating application 114 when it is already running, sending a "time remaining" warning to the user based on the available time usage, or sending a message to an account administrator (e.g., a parent) to request additional time usage for the user to access application 114.

Moreover, application access manager 112 of user device 104 may transmit one or more time usage reports 120 to computing device 102 to indicate the amount of access time logged for the user on application 114. A time usage report 120 may be sent periodically or based on an event or trigger detected by user device 104. In response, computing device 102 is configured to update or increment the accumulated time usage associated with the category of application 114 for the user. In instances when the user accesses other applications in the same category as application 114 on user device 104, user device 104 will transmit the time usage report 120 for the user's time spent on the other applications. In response, computing device 102 will update or increment the accumulated time usage for that category for the user. Also, when the user accesses application 114 or other applications in the same category as application 114 on a different user device (not shown), the other user device will transmit a time usage report 120 to computing device 102, and computing device 102 will update or increment the accumulated time usage for that category. Computing device 102 is also configured to transmit available time usage responses 116 to the other user device.

Application 114 may be any application that a user may access on user device 104. For example, application 114 may fall into a category such as a game, entertainment, social networking, education, productivity/tools, health, or a browser, etc.

As described above, computing device 102 is configured to use a trained machine learning model 106 to determine a category of an application based on a feature set associated with the application, and to determine available time usage related to the category of the application for a user.

Figure 2:
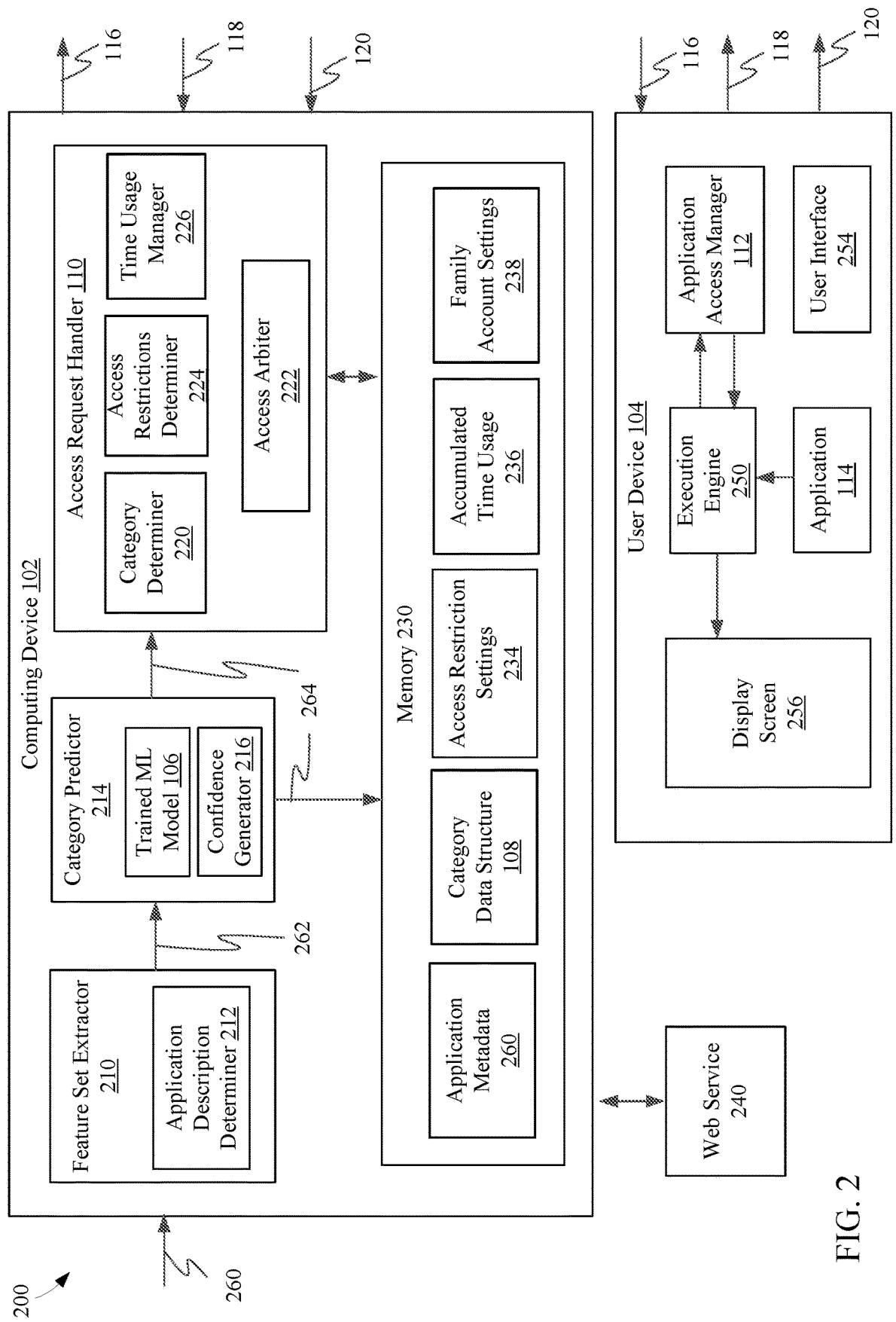
FIG. 2 is a more detailed block diagram of the system shown in FIG. 1, according to an example embodiment.

Note that computing device 102 and user device 104 may be implemented in various ways to perform their functions. For instance, FIG. 2 shows a system 200 that is a more detailed block diagram of system 100 shown in FIG. 1, according to an example embodiment. System 200 includes computing device 102, user device 104, and a web service 240. In the example of FIG. 2, computing device 102 includes a feature set extractor 210, a category predictor 214, access request handler 110, and a memory 230, and user device 104 includes application access manager 112, application 114, an execution engine 250, a user interface 254, and a display screen 256. System 200 is described in further detail as follows.

As described above, computing device 102 is configured to use a trained machine learning model 106 to determine a category of a software application based on a feature set associated with the application, and determine available time usage related to the category of the application for a user. Feature set extractor 210 and category predictor 214 are configured to generate the category of one or more software applications (e.g., application 114) and store the determined one or more categories in category data structure 108 of memory 230.

Feature set extractor 210 is configured to receive application metadata 260 from an external device (not shown), or retrieve application metadata 260 stored in memory 230. Application metadata 260 may include a training dataset and/or a test dataset. The training dataset is utilized to train machine learning model 106 and may include information about a plurality of software applications for which the respective categories are already known. The testing dataset may include information about applications for which the respective categories are unknown but may be predicted by trained machine learning model 106 and stored in category data structure 108.

Application metadata 260 may include various application features such as application name, application description, publisher of the application, and/or size of the application, etc., for one or more applications. Application metadata 260 may also include images related to an application. In some embodiments, application metadata 260 is missing one or more features of an application. For example, machine learning model 106 may be trained to use an application description feature to predict the category of the application. If application metadata 260 is missing the application description (or other application features that may be used for predicting a category) application description determiner 212 may utilize one or more services to obtain the missing application features. For example, a knowledge graph may be automatically accessed to obtain the application description or the other features of the application. In one embodiment, application description determiner 212 is configured to call one or more application programming interfaces (API) (e.g., Microsoft Bing® Web Search, Bing® Entity Search, and/or Bing® Knowledge Graph) to find the application description, images related to the application, or the other missing features of the application. Results received from the API calls may be used to form the application description or other application features for the test and/or training datasets. In some embodiments, the API calls may implement electronic communication to a web service 240 to retrieve the application descriptions, images, or other features of the application.

Feature set extractor 210 is configured to perform preprocessing and feature engineering on application metadata 260 before it is applied to trained machine learning model 106. In some embodiments, the data preprocessing may include translating application metadata 260 to a desired language (e.g., English). Once application metadata 260 is represented in the desired language, feature set extractor 210 may be configured to remove noise from application metadata 260 and/or lemmatize application metadata 260. Feature extractor 210 is configured to perform feature engineering including text vectorization on application metadata 260. The text vectorization transforms application metadata 260 to a numerical feature vector that is sent to trained machine learning model 106 for processing (e.g., model training or predicting categories). In some embodiments, feature set extractor 210 is configured to generate one or more numerical feature vectors 262, for example, as a feature vector table 262 that is populated with the one or more numerical feature vectors. Each of the one or more numerical feature vectors corresponds to a respective application. In one example, a feature vector table 262 may be formatted in rows where each row includes a feature vector corresponding to a different application. Feature vectors 262 may be referred to as numerical feature vectors, a feature set, or a feature vector table, etc.). The data preprocessing and feature engineering processes are described further below with respect to FIG. 5.

Category predictor 214 is configured to receive feature vectors 262 from feature set extractor 210 and output categories and confidence scores 264 for each application represented in feature vectors 262. For example, trained machine learning model 106 is configured to process feature vectors 262 and generate a category for each application represented in feature vectors 262. The confidence generator is configured to determine a confidence score for each of the categories generated by trained machine learning model 106. Category predictor 214 stores the categories and confidence scores 264 for each of the applications in category data structure 108. When application metadata 260 is received by computing device 102 for additional applications, the process may be repeated and category data structure 108 may be updated with categories and confidence scores 264 for the additional applications.

Application metadata 260 may be stored in memory 230 (e.g., as text data and/or feature vectors) as application metadata 260, which may be re-processed by feature set extractor 210 and/or category predictor 214 for improved categorization. For example, trained machine learning model 106 may be re-built, adapted, and/or re-trained to return more accurate results. In one embodiment, a re-trained machine learning model 106 may utilize additional application features (e.g., application publisher, application size, etc.) to improve category prediction results.

As described above, access request handler 110 is configured to provide information to user device 104 to control a user's access to applications that run on user device 102 or on other user devices. In order to perform these functions, access request handler 110 includes a category determiner 220, an access restrictions determiner 224, a time usage manager 226, and an access arbiter 222.

In one embodiment, when the user attempts to launch (or access) application 114 on user device 104, access request handler 110 receives a request related to access to an application 118 from user device 104. The request related to access to an application 118 may include the name and/or and an identifier of application 114 and the name and/or an identifier of the user attempting to launch the application.

Access arbiter 222 is configured to determine a remaining available time usage corresponding to the category of application 114 and transmit the result to user device 104 in the available time usage response 116. Access arbiter 222 is configured to determine the remaining available time usage corresponding to the category of application 114 for the user based on (1) a machine learning determined category associated with application 114, (2) access restrictions settings associated with the category of application 114 for the user, and (3) accumulated time usage 236 associated with the category of application 114 and the user. Access arbiter 222 is configured to call category determiner 220, access restrictions determiner 224, and/or time usage manager 226 to retrieve this information used to determine the available time usage for the category of application 114 and the user. Access arbiter 222 is configured to transmit the available time usage to user device 104 in the available time usage response 116.

In some embodiments, category determiner 220 is configured to receive the name and/or identifier of application 114 from the request related to access to an application 118. Category determine 220 may utilize the name and/or identifier of application 114 to retrieve a category (e.g., determined by trained machine learning model 106) associated with application 114 from category data structure 108. Category determiner 220 is configured to transmit the machine learning determined category to access arbiter 222 for use in determining the available time usage for category of application 114.

Access restrictions determiner 224 is configured to retrieve access restriction settings 234 that are configured in memory 230 by an administrator user (e.g., a parent) and associated with the user (e.g., a child) of application 114 in memory 230. For example, access restrictions settings 234 may include time usage limits associated with the user for one or more application categories. As described above, in one example, access restrictions (e.g., time usage or screen time usage) associated with specified application categories (e.g., social media, games, etc.) may be configured by an administrator (e.g., a parent) for non-administrator users (e.g., children). The access restrictions determiner transmits the access restrictions settings, which are associated with the category of application 114 for the user, to access arbiter 222 for use in determining the available time usage for the category of application 114.

Time usage manager 226 is configured to determine an accumulated time usage 236 associated with the category of application 114 and the user. Accumulated time usage 236 may be stored in memory 230. Time usage manager 226 may log time usage for each application category and for each user of system 200. Time usage manager 226 is configured to receive time usage reports 120 from user device 104 and from other user devices from which the user accesses software applications. Time usage reports 120 may indicate the amount of time a user spends accessing an application. For example, time usage reports 120 may indicate application 114 name and/or identifier, the user, and an amount of time that the user has spent accessing application 114. Time usage manager 226 may be configured to retrieve the category of application 114, which is named or identified in a time usage report 120, from the category determiner 220. Moreover, time usage manager 226 is configured to accrue time usage for the user based on multiple time usage reports 120, and determine an accumulated time usage associated the category of application 114 and the user. Time usage manager 226 transmits the accumulated time usage to access arbiter 222 for use in determining the available time usage for the category of application 114. In some embodiments, a period of time over which time usage is accrued may be configurable. For example, accumulated time usage 236 for a user to access one or more applications of a specified category may be reset periodically (e.g., hourly, daily, weekly, etc.) based on a configured parameter.

Access arbiter 222 is configured to determine the remaining available time usage corresponding to the category of application 114 for the user and transmit the result to user device 104 in available time usage response 116 for enforcing the time usage restrictions one user device 104.

User device 104 may be configured to transmit a request related to application 118 periodically while the user is logged into and/or using application 114. In response, access request handler 110 may be configured to return an available time usage response 116 to indicate remaining time usage available for the user on application 114 and/or the category of application 114.

In some embodiments, a user account is configured in memory 230. For example, the user account may include a group of users (e.g., a family of users) stored in family account settings 238 of memory 230. Each user of the group may be configured as either a non-administrator (e.g., a child) or an administrator (e.g., a parent). Access request handler 110 may be configured to verify that a user identified in a request related to application 118 is a member of the group account (e.g. a member of the family) prior to determining or providing a remaining available time usage to user device 104 for the user identified in request 118.

As described above, the user may attempt to access application 114 on user device 104 and in response, application manager 112 may transmit a request related to access an application 118 to computing device 102. Application access manager 112 is configured to receive available time usage response 116 from computing device 102 in response to request 118 and enforce the available time usage limits that are provided in available time usage response 116. Moreover, application access manager 112 may periodically transmit time usage reports 120 to computing device 102 to indicate the amount of access time logged for the user on application 114. Access manager 112 and application 114 are described further above with respect to FIG. 1.

Execution engine 250 is configured to execute application 114 based on commands and information received via user interface 254 and/or display screen 256 (e.g., via touch screen technology). For example, the user may launch and/or interact with application 114 via user interface 254 and/or display screen 256. Various user interfaces of user device 104 are described with respect to FIG. 16. Application access manager 112 may be configured to enable execution engine 250 to execute application 114 based on available time usage response 116 from access arbiter 222 of computing device 102. For example, in response to an available time usage response 116, application access manager 112 may control execution engine 250 to launch application 114 when a configured amount of remaining time usage is available, deny access to application 114 when the remaining available time usage is below a threshold, discontinue executing application 114 when the remaining available time usage is below a threshold, transmit a warning to the user when the remaining available time usage is below a threshold, and/or transmit a message to an account administrator (e.g., a parent) to request additional time usage for the user to access application 114 when the remaining available time usage is below a threshold. Computing device 102 and user device 104 are described in more detail below with respect to FIG. 16.

Figure 3:
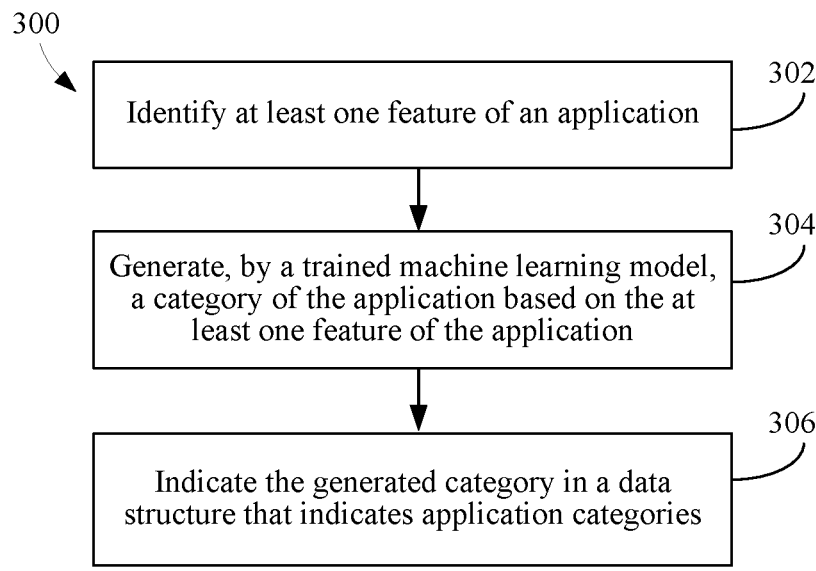
FIG. 3 is a flowchart for generating a category of a software application and indicating the category in a data structure, according to an example embodiment.

Computing device 102 may operate in various ways to perform functions of systems 100 and 200. For example, FIG. 3 is a flowchart for generating a category of a software application and indicating the category in a data structure, according to an example embodiment. In some embodiments, the steps of flowchart 300 may be performed by computing device 102. Note that the steps of flowchart 300 may be performed in an order different than shown in FIG. 3 in some embodiments. Furthermore, not all steps of flowchart 300 need to be performed in all embodiments. The steps of flowchart 300 are described with reference to FIGS. 1 and 2.

Flowchart 300 begins with step 302. In step 302, at least one feature of a software application is identified. For example, feature set extractor 210 identifies at least one feature of application 114. As described above, feature set extractor 210 receives application metadata 260 and generates feature vectors 262. Trained machine learning model 106 uses feature vectors 262 to predict respective categories of the applications represented in the features sets. In some embodiments, application metadata 260 is missing an application description (or another application features). In this case, application description determiner 212 may utilize one or more services to obtain the missing application descriptions (or the other application features). For example, application description determiner 212 may automatically access a knowledge graph to obtain the application description. Feature set extractor 210 may preprocess application metadata 260. For example, feature set extractor 210 may translate application metadata 260 to a desired language, remove noise from application metadata 260, and/or lemmatize application metadata 260. Feature extractor 210 may perform feature engineering including text vectorization on application metadata 260 to generate a numerical feature vectors 262. Feature vectors 262 are sent to trained machine learning model 106 for predicting categories based on the feature vectors.

In step 304, a trained machine learning model generates a category of the application based on the at least one feature of the application. For example, trained machine learning model 106 receives feature vectors 262 and processes each feature vector. Trained machine learning model 106 generates a category for each application based on its respective feature vector in feature vectors 262. In other words, trained machine learning model 106 maps received feature vectors 262 to a particular application category. Confidence generator 216 may determine a confidence score for the category generated by trained machine learning model 106 for each application.

In step 306, the generated category is indicated in a data structure that indicates application categories. For example, category predictor 214 stores the categories and confidence scores 264 that are generated by trained machine learning model 106 in category data structure 108. Category data structure 108 may include records for at least each application associated with a feature vector, where each record includes one or more of a respective category, a confidence score, and an application name or identifier. Category data structure 108 may also include records for applications and corresponding categories that are received from an external source (e.g., App Store®). The generated and/or received categories may utilize different words (category names) to reference a same or similar categories. The different category names for same or similar categories may be reconciled and revised as standard category names that are stored in data structure 108.

Figure 4:
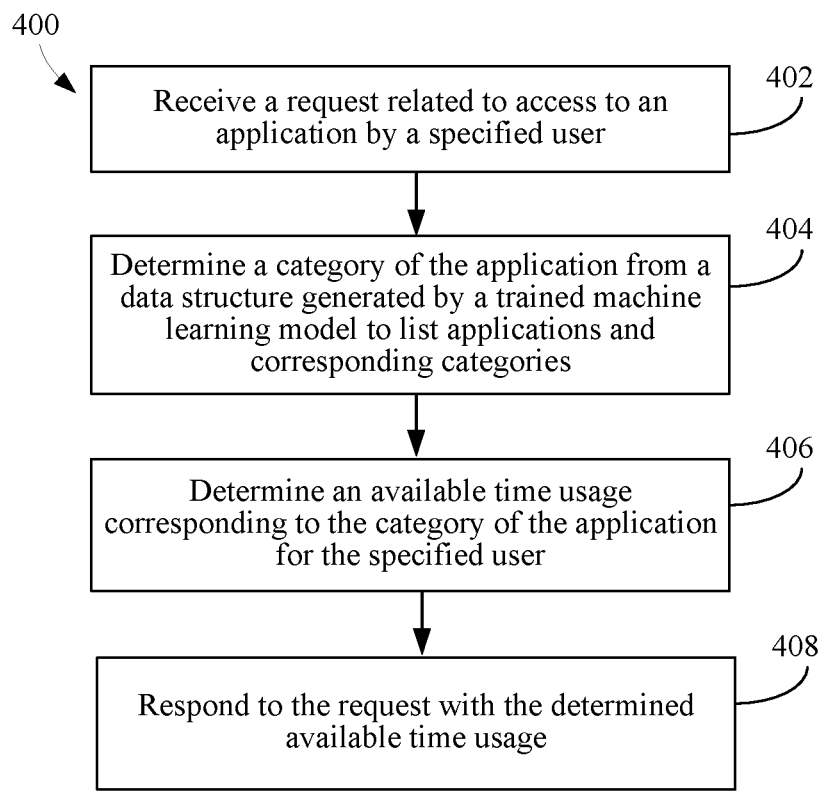
FIG. 4 is a flowchart for responding to an application access request for a specified user based on an application category and available time usage for the category, according to an example embodiment.

Access request handler 110 may operate in various ways to perform functions described with respect to systems 100 and 200. For example, FIG. 4 is a flowchart 400 for responding to an application access request for a specified user based on an application category and available time usage for the category, according to an example embodiment. In some embodiments, the steps of flowchart 400 may be performed by computing device 102. Note that the steps of flowchart 400 may be performed in an order different than shown in FIG. 4 in some embodiments. Furthermore, not all steps of flowchart 400 need to be performed in all embodiments. The steps of flowchart 400 are described with reference to FIGS. 1 and 2.

In step 402, a request related to access to an application by a specified user is received. For example, access request handler 110 receives a request related to access to an application 118 from user device 104 for access to application 114 by a specified user. The request related to access to an application 118 may include the name and/or an identifier of application 114 and the name and/or an identifier of the specified user. Access request handler 110 may receive the request when the specified user attempts to launch application 114 or while the specified user is logged into and/or using the application (e.g., periodically, based on user input, based on an event in user device 104, etc.). Requests related to access to an application 118 may be received in a similar manner from other user devices for the same specified user so that access request handler 110 may the accumulate the user's time usage across multiple user devices.

In step 404, a category of the application is determined from a data structure that is generated by a trained machine learning model to list applications and corresponding categories. For example, access arbiter 222 of category determiner 220 receives the name and/or an identifier of application 114 from a request related to access to an application 118. Access arbiter 222 may utilize the name and/or identifier of application 114 to retrieve a category (e.g., a category determined by trained machine learning model 106) from category data structure 108, which is associated with application 114.

In step 406, an available time usage corresponding to the category of the application is determined for the specified user. For example, access arbiter 222 determines the remaining available time usage corresponding to the category of application 114 for the specified user based on (1) a machine learning determined category associated with application 114, (2) access restriction settings associated with the category of application 114 for the user, and (3) accumulated time usage 236 associated with the category of application 114 and the specified user. Access arbiter 222 may call category determiner 220, access restrictions determiner 224, and/or time usage manager 226 to retrieve the above described respective information used to determine the available time usage corresponding to the category of application 114 for the specified user.

In step 408, the request is responded to with the determined available time usage. For example, access arbiter 222 responds to the request related to access to an application 118 from user device 104 by transmitting the determined available time usage in an available time usage response 116. Available time usage response 116 may indicate the remaining amount of time that the specified user is allowed to access application 114 or any other application of the same category. Access arbiter 222 may also respond to other requests related to application 118 that are received while the user is logged into and/or using application 114 on user device 104 or another device.

Figure 5:
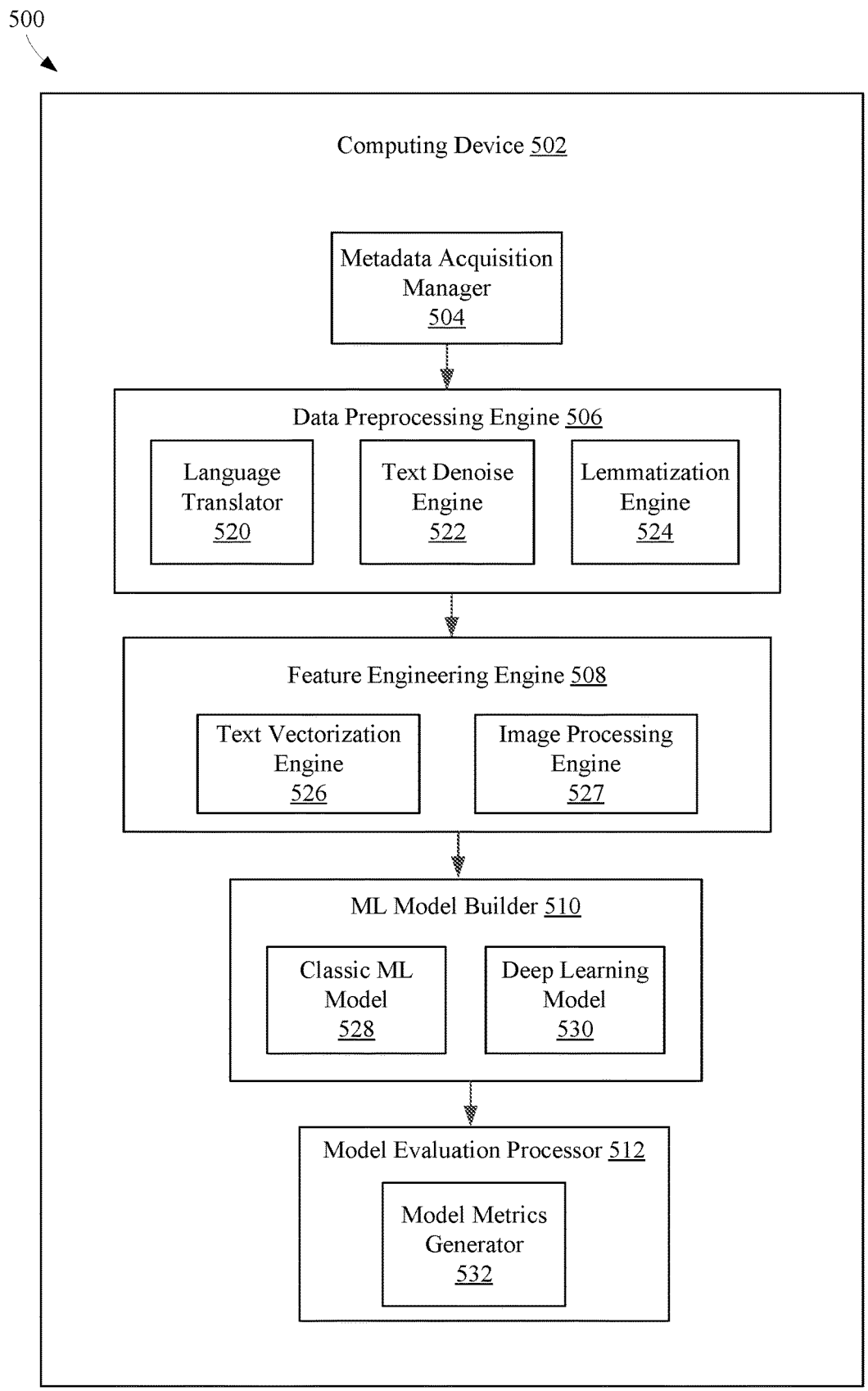
FIG. 5 is a block diagram of a computing device for training the machine learning model shown in FIGS. 1 and 2, according to an example embodiment.

A system for training trained machine learning model 106 may include system 100 and/or 200, or it may include a system on another computing device. FIG. 5 is a block diagram of a system 500 that includes a computing device 502 for training machine learning model 106, according to an example embodiment. Referring to FIG. 5, a system 500 includes a computing device 502, which includes a metadata acquisition manager 504, a data preprocessing engine 506, a feature engineering engine 508, a machine learning builder 510, and a model evaluation processor 512. In some embodiments, computing device 502 may be similar or substantially the same as computing device 102. Example implementations of computing device 502 are described in more detail below with respect to FIG. 16.

In some embodiments, metadata acquisition manager 504, data preprocessing engine 506, and feature engineering engine 508 may perform similar or substantially the same functions as described above with respect to feature set extractor 210 and application description determiner of FIG. 2. System 500 processes application metadata that is used to train an untrained machine learning model 106 so that trained machine learning model 106 is configured to determine the category of an application based on features of the application metadata.

Metadata acquisition manager 504 is configured to receive application metadata including a training dataset. The training dataset may include information about a plurality of software applications for which the respective categories are already known. As described above, the training data may include application metadata (features) such as application name, application description, application category, publisher of the application, and/or size of the application, etc. for one or more applications. The application metadata may include different words (category names) to reference a same or similar category. Metadata acquisition manager 504 may be configured to reconcile (or map) conflicting category names into standard category names (e.g., "Navigation & maps" to "Navigation and Maps," or "Health & fitness/Medical" to "Health").

The application metadata may be missing one or more application features (e.g., the category or description of an application). Metadata acquisition manager 504 is configured to utilize one or more services such as a knowledge graph service to obtain the missing features. For example, metadata acquisition manager 504 may call one or more APIs (e.g., Microsoft Bing® Web Search, Bing® Entity Search, and/or Bing® Knowledge Graph) to find the application category, application description, images related to the application, or other missing features of the application. Results received from the API calls may be used to form the application metadata (e.g., category, description, or other features) for training untrained machine learning model 106. In some embodiments, the API calls may implement electronic communication to web service 240 to retrieve the application metadata. The metadata acquisition manager is configured to transmit the application metadata to data preprocessing engine 506.

Data preprocessing engine 506 is configured to perform preprocessing of the application metadata, if needed, to prepare the data for feature engineering and/or training untrained machine learning model 106. Data preprocessing engine 506 may include a language translator 520, a text denoise engine 522, and/or a lemmatization engine 524.

Language translator 520 is configured to translate the application metadata to a desired language (e.g., English). In one example, language translator 520 is configured to call a cloud-based machine translation service to perform and return the translation (e.g., Microsoft® translator text API and Microsoft® Azure® Services). Text denoise engine 522 is configured to remove noise from the application metadata. For example, text denoise engine 522 may strip unnecessary characters (e.g., html tags, square brackets, etc.), remove punctuation, and/or remove stop-words from the application metadata. Lemmatization engine 524 is configured to reduce words in the application metadata to their root (e.g., convert "gaming" to "game"). Data preprocessing engine 506 is configured to transmit the preprocessed application metadata to feature engineering engine 508

In some embodiments, untrained machine learning model 106 is configured to handle numerical data rather than text data, or image based information. Thus, feature engineering engine 508 is configured to perform text vectorization of the application metadata or image processing. Text vectorization engine 526 is configured to transform the application metadata to a numerical feature vector that is formatted for training machine learning model 106. Text vectorization engine 526 may utilize various text data mining and/or text vectorization techniques such as Bag of Words (representing text as a multiset of words), term frequency-inverse document frequency (TF-IDF), or embeddings for encoding words into a vector of continuous numbers (e.g., BERT, GloVe (global vectors), Word2Vec, FastText). In some embodiments, text vectorization engine 526 generates one or more numerical feature vectors and generates a feature vector table populated with the one or more numerical feature vectors. The feature vector table may be formatted in rows where each row includes a feature vector corresponding to a different application. In some embodiments, deeply bidirectional BERT is used to generate the numerical feature vectors. When the application metadata includes images, the image processing engine 527 is configured to process the images and generate feature data adapted for use in the machine learning model builder 510. Feature engineering engine 508 may pass the numerical feature vectors or image based feature data to machine learning model builder 510.

Machine learning model builder 510 may utilize various machine algorithms to build and train untrained machine learning model 106 (e.g., logistic regression, random forest, Perceptron, dense deep learning models, etc.). Machine learning model builder 510 may train a classical machine learning model 528 (e.g., XGBoost, random forest, etc.) and/or a deep learning model 530 (e.g., an embedding based model) to generate trained machine learning model 106. In one embodiment, deep learning model 530 includes a logistic regression model that is trained to determine the category of an application based on the description of the application. For example, deep learning model 530 may receive numerical feature vectors representing descriptions and categories of a plurality of software applications, and train the logistic regression model based on the feature vectors to generate trained machine learning model 106. Trained machine learning model 106 may be retrained by machine learning model builder 510 with application metadata from additional applications for improved prediction performance (e.g., more accurate results). Also, prediction performance may be improved by using additional features (e.g., publisher, application size, images, etc.) from the software applications for training untrained machine learning model 106 and predicting the category with trained machine learning model 106.

Model evaluation processor 512 is configured to evaluate trained machine learning model 106 generated by machine model builder 510 to determine various prediction performance metrics. For example, model metrics generator 532 may compare trained machine learning model 106 input and the prediction target (e.g., the known category) to determine prediction accuracy (percent of correct predictions). The accuracy may be based on true positives (TP), true negatives (TN), false positives (FP), and false negatives (FN) (e.g., TP+TN/TP+TN+FP+FN). A prediction micro precision may be generated, which determines the proportion of positive predictions that were correct (e.g., TP/(TP+FP)). An average may be determined by considering instances individually. The model may be evaluated for macro precision by computing the precision independently for each class and then taking the average. Micro and macro recall may also be generated (e.g., recall=TP/(TP+FN)). Also, micro and macro F1 scores may be determined to evaluate the trained model. F1 score considers precision and the proportion of actual positives that were identified correctly (e.g., F1 score=2* (precision*recall)/(precision+recall)).

Figure 6:
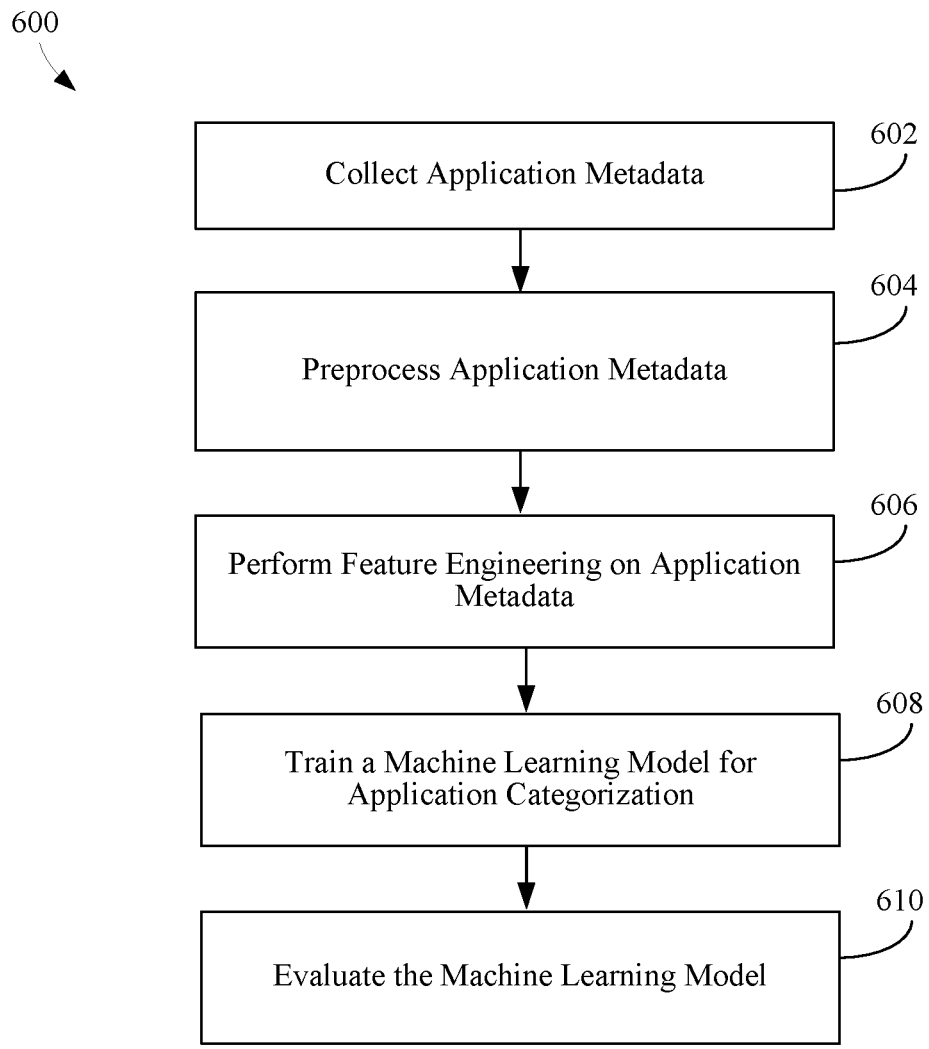
FIG. 6 is a flowchart for training the machine learning model shown in FIGS. 1, 2, and 5, according to an example embodiment.

System 500 may operate in various ways to train machine learning model 106. For example, FIG. 6 is a flowchart 600 for training the machine learning models shown in FIGS. 1, 2, and 5 according to an example embodiment. In some embodiments, the steps of flowchart 600 may be performed by computing device 102 or computing device 502. Note that the steps of flowchart 600 may be performed in an order different than shown in FIG. 6 in some embodiments. Furthermore, not all steps of flowchart 600 need to be performed in all embodiments. The steps of flowchart 600 are described with reference to FIG. 5.

In step 602, application metadata may be collected. For example, application metadata is collected by metadata acquisition manager 504 for a plurality of applications. As described above, metadata acquisition manager 504 is configured to receive application metadata including a training dataset with information about a plurality of software applications for which the respective categories are already known. Metadata acquisition manager 504 may call one or more services (e.g., API calls) such as a knowledge graph service to obtain any missing features in the application data, such as a missing application description or category. Results received from the API calls may be used to create the application metadata for use in training a model.

In step 604, the application metadata may be preprocessed for feature engineering and/or machine learning model training. For example, data preprocessing engine 506 is configured to perform preprocessing of the application metadata to prepare the data for feature engineering and/or training machine learning model 106. Language translator 520 may translate the application metadata to a desired language (e.g., English) or may call a cloud-based machine translation service to perform and return the translation. Text denoise engine 522 may remove noise (e.g., html tags, square brackets, punctuation, stop words etc.) from the application metadata. Lemmatization engine 524 may reduce words in the application metadata to their root. Data preprocessing engine 506 is configured to transmit the preprocessed application metadata to feature engineering engine 508.

In step 606, feature engineering may be performed on application metadata. For example, feature engineering engine 508 may perform text vectorization of the application metadata. Text vectorization engine 508 transforms the application metadata to a numerical feature vector that is formatted for training untrained machine learning model 106. Text vectorization engine 526 may utilize various text data mining and/or text vectorization techniques to create the numerical feature vectors. Text vectorization engine 526 may populate a feature vector table with the one or more numerical feature vectors based on the application metadata. In some embodiments, deeply bidirectional BERT is used to generate the numerical feature vector. Image processing engine 527 may analyze images related to use of an application to determine image based features. Feature engineering engine 508 may pass the numerical feature vector or image based features to machine learning model builder 510.

In step 608, a machine learning model may be trained for application categorization. For example, machine learning model builder 510 may utilize various machine algorithms to build and train untrained machine learning model 106 (e.g., logistic regression, random forest, Perceptron, dense deep learning models, etc.) utilizing the numerical feature vector or image based features. In one example, deep learning model 530 may receive numerical feature vectors representing descriptions and categories of a plurality of software applications, and train a logistic regression model based on the numerical feature vectors to generate trained machine learning model 106. Trained machine learning model 106 may be retrained with metadata features from additional applications for improved prediction performance (e.g., more accurate results). Also, prediction performance may be improved by training with additional application metadata features (e.g., publisher, application size, etc.) for retraining trained machine learning model 106 and predicting the category.

In step 610, the trained machine learning model may be evaluated. For example, model evaluation processor 512 may evaluate trained machine learning model 106 generated by machine model builder 510 to determine various prediction performance metrics. For example, model metrics generator 532 may compare the machine learning model input and the prediction target (e.g., the known category) to determine prediction accuracy, micro precision, macro precision, micro and macro recall, and/or micro and macro F1 scores, etc.

Figure 7:
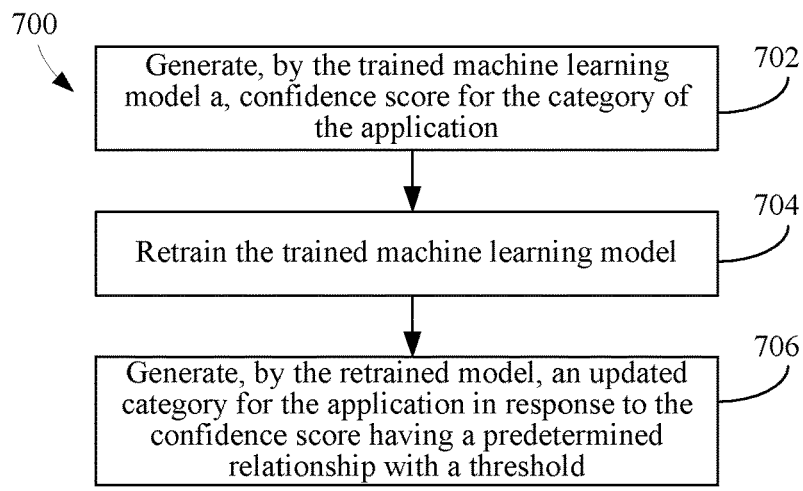
FIG. 7 is a flowchart for retraining the trained machine learning model of FIGS. 1 and 2 and generating an updated category for an application, according to an example embodiment.

As described above, category predictor 214, which includes trained machine learning model 106 and confidence generator 216, is configured to generate application categories and a confidence score for each of the categories. FIG. 7 is a flowchart 700 for retraining trained machine learning model 106 of FIGS. 1 and 2 and generating an updated category for an application, according to an example embodiment. In an embodiment, flowchart 700 may be performed by computing device 102 and/or computing device 502. For purposes of illustration, flowchart 700 is described with respect to FIGS. 2 and 5.

Flowchart 700 of FIG. 7 begins with step 702. In step 702, trained machine learning model 106 generates a confidence score for the category of the application. For example, trained machine learning model 106 receives a feature vectors 262 based on application metadata (e.g., application descriptions), generates a category for each application and stores the categories in category data structure 108 where each category is associated with a corresponding prediction confidence score. The confidence scores are generated by confidence score generator 216.

In step 704, trained machine learning model 106 is retrained. For example, machine language model builder 510 may retrain trained machine learning model 106 when data with additional ground truth is available. Also, the model may be retrained with metadata associated with additional software applications or with additional and/or different application features (e.g., publisher, application size, etc.) to improve or adapt machine learning model 106 and improve category predictions.

In step 706, the retrained machine learning model may generate an updated category for an application in response to a confidence score having a predetermined relationship with a threshold. For example, category predictor 214 may compare confidence scores stored in category data structure 108 to a confidence threshold. In instances when a confidence score for an application is below a predetermined confidence threshold, retrained machine learning model 106 may receive a feature vector from feature set extractor 210, or memory 230, and generate an updated category for the application. Confidence score generator 216 may generate an updated confidence score for the updated category. Category predictor 214 may transmit the updated category and updated confidence score (categories and confidence scores 264) to category data structure 108. This process may be performed for a plurality of applications based on their associated confidence scores stored in category data structure 108.

Figure 8:
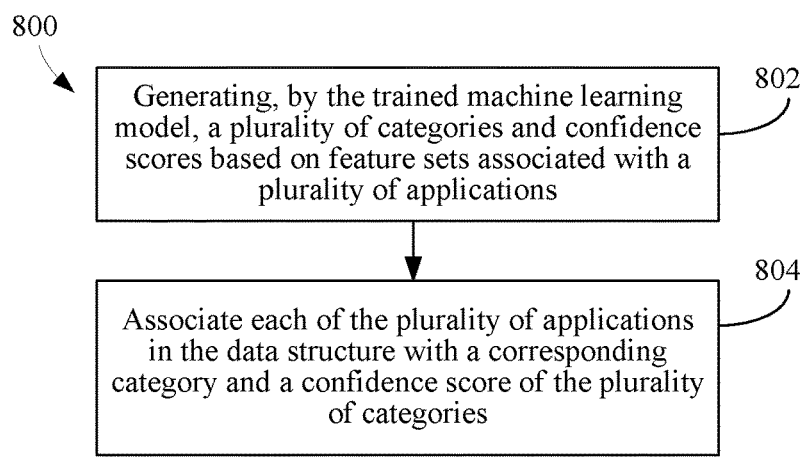
FIG. 8 is a flowchart for generating categories and confidence scores for a plurality of applications and storing the categories and confidence scores in a data structure, according to an example embodiment.

As described above, category predictor 214, which includes trained machine learning model 106 and confidence generator 216, is configured to generate application categories and a confidence score for each of the categories. FIG. 8 is a flowchart 800 for generating categories and confidence scores for a plurality of applications and storing the categories and confidence scores in a data structure, according to an example embodiment. In an embodiment, flowchart 800 may be performed by computing device 102. For purposes of illustration, flowchart 800 is described with respect to FIG. 2.

In step 802, the trained machine learning model generates a plurality of categories and confidence scores based on feature sets associated with a plurality of applications. For example, feature set extractor 210 may generate a plurality of numerical feature vectors 262 for a plurality of respective software applications, and create a feature vector table 262 that is populated with the numerical feature vectors. In one example, feature vector table 262 may be formatted in rows where each row includes a feature vector corresponding to a different application. However, the numerical feature vectors may be organized in any other suitable arrangements (e.g., continuous feature vectors). Category predictor 214, including trained machine learning model 106 and confidence score generator 216, receives feature vectors 262 and generates a category and corresponding confidence score for each of the respective software applications based on the features of feature vector table 262.

In step 804, each of the plurality of applications is associated in data structure 108 with a corresponding category and a confidence score of the plurality of categories. For example, category predictor 214 transmits the generated categories and confidence scores 264 for each of the respective software applications to category data structure 108. Each of the generated categories is associated in data structure 108 with a corresponding confidence score and a name or identifier for a respective software application.

Figure 9:
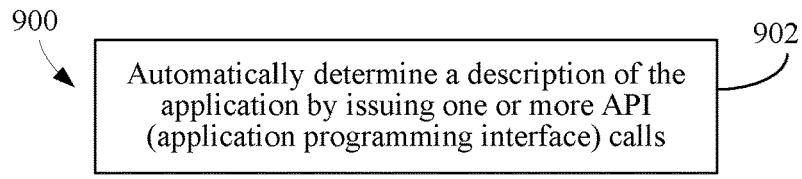
FIG. 9 is a flowchart for automatically determining an application description by issuing an application interface (API) call, according to an example embodiment.

Application description determiner 212 or metadata acquisition manager 504 may operate in various ways to determine an application description for an application feature set. For example, FIG. 9 is a flowchart 900 for automatically determining an application description by issuing an API call, according to an example embodiment. In an embodiment. Flowchart 900 may be performed by computing device 102 or computing device 520. For purposes of illustration, flowchart 900 is described with respect to FIG. 2.

In step 902, a description of the application is automatically determined by issuing one or more API calls. For example, trained machine learning model 106 may be trained to use an application description feature to predict the category of the application. If application metadata 260 is missing the application description application description determiner 212 calls one or more API's (e.g., Microsoft Bing® Web Search, Bing® Entity Search, and/or Bing® Knowledge Graph) to find the application description or the other missing features of the application. Results received from the API calls may be used to form the application description for the test and/or training data. In some embodiments, the API calls may implement electronic communication to a web service 240 to retrieve the application descriptions or other features of the application.

Figure 10:
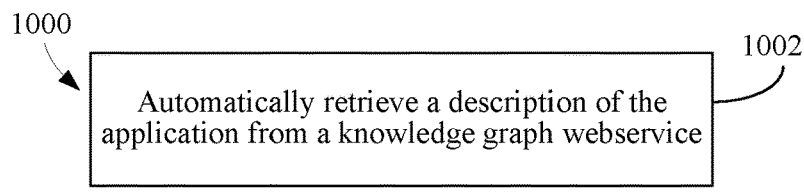
FIG. 10 is a flowchart for automatically retrieving a description of an application from a knowledge graph webservice, according to an example embodiment.

As described above, application description determiner 212 or metadata acquisition manager 504 may operate in various ways to determine an application description for an application feature set. For example, FIG. 10 is a flowchart 1000 for automatically retrieving a description of an application from a knowledge graph webservice, according to an example embodiment. Flowchart 1000 may be performed by computing device 102 or computing device 520. For purposes of illustration, flowchart 1000 is described with respect to FIG. 2.

In step 1002, a description of the application is automatically retrieved from a knowledge graph webservice. For example, application description determiner 212 may issue an API call to automatically access a knowledge graph to obtain a description of an application for use in a feature vector. In one embodiment, application description determiner 212 calls one or more API's (e.g., Microsoft Bing® Web Search, Bing® Entity Search, and/or Bing® Knowledge Graph) to implement electronic communication to web service 240 to retrieve the application descriptions utilizing the knowledge graph.

Figure 11:
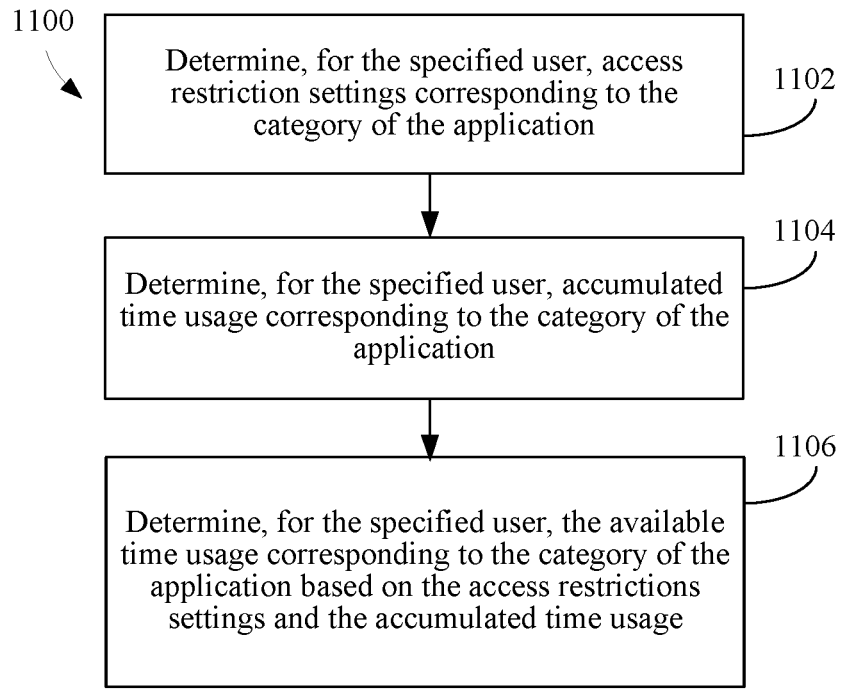
FIG. 11 is a flowchart for determining a specified user's available time usage for a category of an application, according to an example embodiment.

FIG. 11 is a flowchart 1100 for determining a specified user's available time usage for a category of an application, according to an example embodiment. Flowchart 1100 may be performed by computing device 102. For purposes of illustration, flowchart 1100 is described with respect to FIG. 2.

In step 1102, access restriction settings corresponding to the category of an application are determined for a specified user. For example, access restrictions determiner 224 retrieves access restrictions settings 234 that are configured in memory 230 and associated with the user of application 114 in memory 230. Access restrictions settings 234 may include time usage limits associated with a user for one or more application categories. For example, access restrictions (e.g., time usage or screen time usage) associated with specified application categories (e.g., social media, games, etc.) may be configured by an administrator (e.g., a parent) for non-administrator user (e.g., children). The access restrictions determiner transmits the access restrictions settings, which are associated with the category of application 114 for the specified user, to access arbiter 222 for use in determining the available time usage for the category of application 114.

In step 1104, accumulated time usage corresponding to the category of the application is determined for the specified user. For example, time usage manager 226 determines an accumulated time usage 236 associated with the category of application 114 and the specified user. Accumulated time usage 236 may be stored in memory 230. In general, time usage manager 226 logs time usage for each application category and for each user of system 200.

Time usage manager 226 receives time usage reports 120 from user device 104 and from other user devices from which the specified user accesses software applications. Time usage reports 120 indicate the amount of time spent accessing an application and/or the category of the application by the specified user. Time usage manager 226 accrues time and determines an accumulated time usage associated with the category of application 114 and the specified user. Time usage manager 226 transmits the accumulated time usage to access arbiter 222 for use in determining the available time usage for the category of application 114 for the specified user.

In step 1106, an available time usage corresponding to the category of an application is determined for a specified user based on access restriction settings and accumulated time usage. For example, access arbiter 222 receives the category of an application from category determiner 220, receives access restrictions for the specified user corresponding to the category from access restriction determiner 224, and receives accumulated time usage corresponding to the category for the specified user from time usage manager 226. In response, access arbiter 222 determines a remaining available time usage corresponding to the category of application 114 for the specified user. The access arbiter transmits the remaining available time usage to user device 104 in the available time usage response 116.

Figure 12:
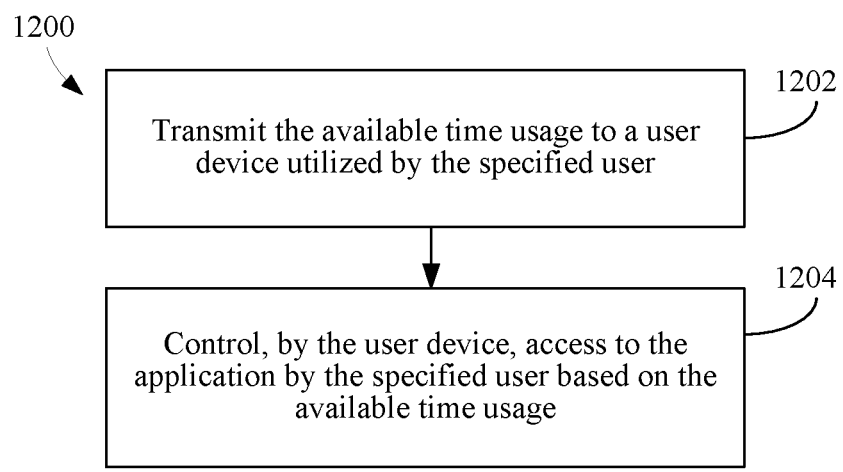
FIG. 12 is a flowchart for transmitting available time usage to a specified user's device and controlling access to an application for the specified user based on access restrictions and accumulated time usage, according to an example embodiment.

FIG. 12 is a flowchart 1200 for transmitting available time usage to a specified user's device and controlling access to an application for the specified user based on access restrictions and accumulated time usage, according to an example embodiment. Flowchart 1200 may be performed by computing device 102. For purposes of illustration, flowchart 1200 is described with respect to FIG. 2.

In step 1202, available time usage is transmitted to a user device utilized by the specified user. For example, as described above, access arbiter 222 determines a remaining available time usage corresponding to the category of application 114 for the specified user. Access arbiter 222 transmits the remaining available time usage to user device 104 in an available time usage response 116.

In step 1204, the user device controls access to the application by the specified user based on the available time usage. For example, as indicated above, when a user attempts to launch application 114 or while the user is accessing application 114, application access manager 112 transmits a request related to access to an application 118 including (1) the name and/or and an identifier of application 114, and/or (2) the name and/or an identifier of the user attempting to launch the application to computing device 102. In response, application access manager 112 receives the available time usage response 116 and determines the remaining available time usage. Based on the remaining available time usage, application access manager 112 may perform an action (e.g., allow the user to launch application 114, denying access to application 114, deactivate application 114 if it is running, transmit a warning to the specified user based on the available time usage, or transmit a message to an account administrator (e.g., parent) to request additional time usage for the user to access application 114).

Figure 13:
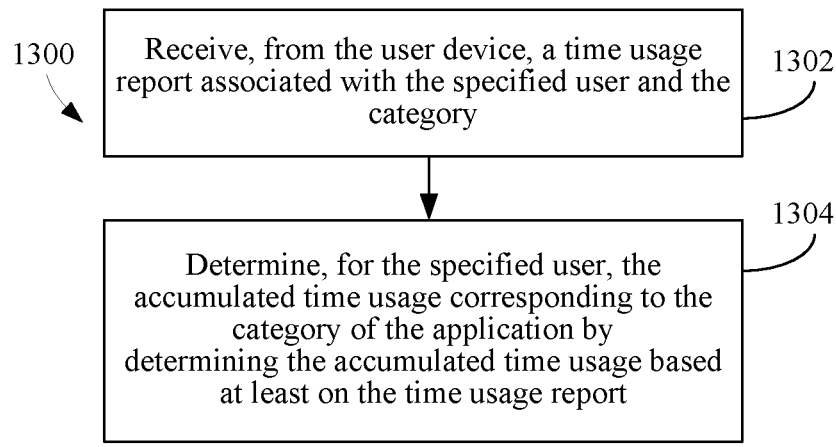
FIG. 13 is a flowchart for receiving usage reports by a computing device from a user device and determining accumulated time usage for the user, according to an example embodiment.

FIG. 13 is a flowchart 1300 for receiving usage reports by a computing device from a user device and determining accumulated time usage for the user, according to an example embodiment. For purposes of illustration, flowchart 1300 is described with respect to FIG. 2.

In step 1302, a time usage report associated with the specified user and the category is received from the user device. For example, access arbiter 222 may periodically receive time usage reports 120 from application access manager 112 of user device 104. A time usage report 120 may indicate an amount of access time that has been logged for the user on application 114 or the category of application 114. Also, when the user accesses other applications in the same category as application 114 on user device 104, access arbiter 222 receives from user device 104, a time usage report 120 for the user's time spent on the other application to computing device 102. Moreover, when the user accesses application 114 or other applications in the same category as application 114 on a different user device (not shown), access arbiter 222 receives a time usage report 120 from the other user device.

In step 1304, the accumulated time usage corresponding to the category of the application is determined for the specified user by determining the accumulated time usage based at least on the time usage report. For example, in response to receiving one or more time usage reports 120 for the specified user, access arbiter 222 updates or increments accumulated time usage 236 for the category of application 114 and the specified user.

Figure 14:
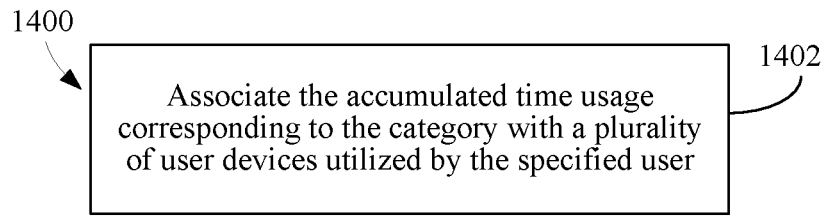
FIG. 14 is a flowchart for associating a user's accumulated time usage for a category with a plurality of devices utilized by the user, according to an example embodiment.

FIG. 14 is a flowchart 1400 for associating a user's accumulated time usage for a category with a plurality of devices utilized by the user, according to an example embodiment. For purposes of illustration, flowchart 1400 is described with respect to FIG. 2.

In step 1402, the accumulated time usage corresponding to the category is associated with a plurality of user devices utilized by the specified user. For example, as described above, when the specified user accesses application 114 or other applications in the same category as application 114 on a user device (not shown) other than user device 104, access arbiter 222 receives a time usage report 120 from the other user device. The access arbiter increments accumulated time usage 236 based on time usage report 120 from the other user device.

Figure 15:
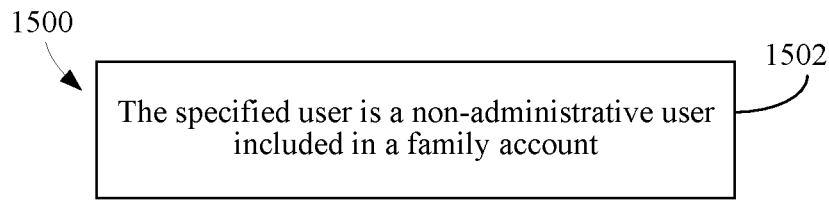
FIG. 15 is a flowchart for identifying whether a specified user is a non-administrative user included in a family account, according to an example embodiment.

FIG. 15 is a flowchart 1500 for identifying whether a specified user is a non-administrative user included in a family account, according to an example embodiment. For purposes of illustration, flowchart 1500 is described with respect to FIG. 2.

In step 1502, the specified user is a non-administrative user included in a family account. For example, a user account may include a group of users (e.g., a family of users). The account is configured in family account settings 238 of memory 230. Each user of the group may be configured as either a non-administrator (e.g., a child) or an administrator (e.g., a parent). Access request handler 110 may verify that a specified user identified in a request related to application 118 is a user of the group account (e.g. a member of the family) prior to determining or transmitting a remaining available time usage response 116 to user device 104 for the specified user.

III. Additional Examples and Advantages

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 of FIG. 1, system 200 of FIG. 2, and system 500 of FIG. 5, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 16:
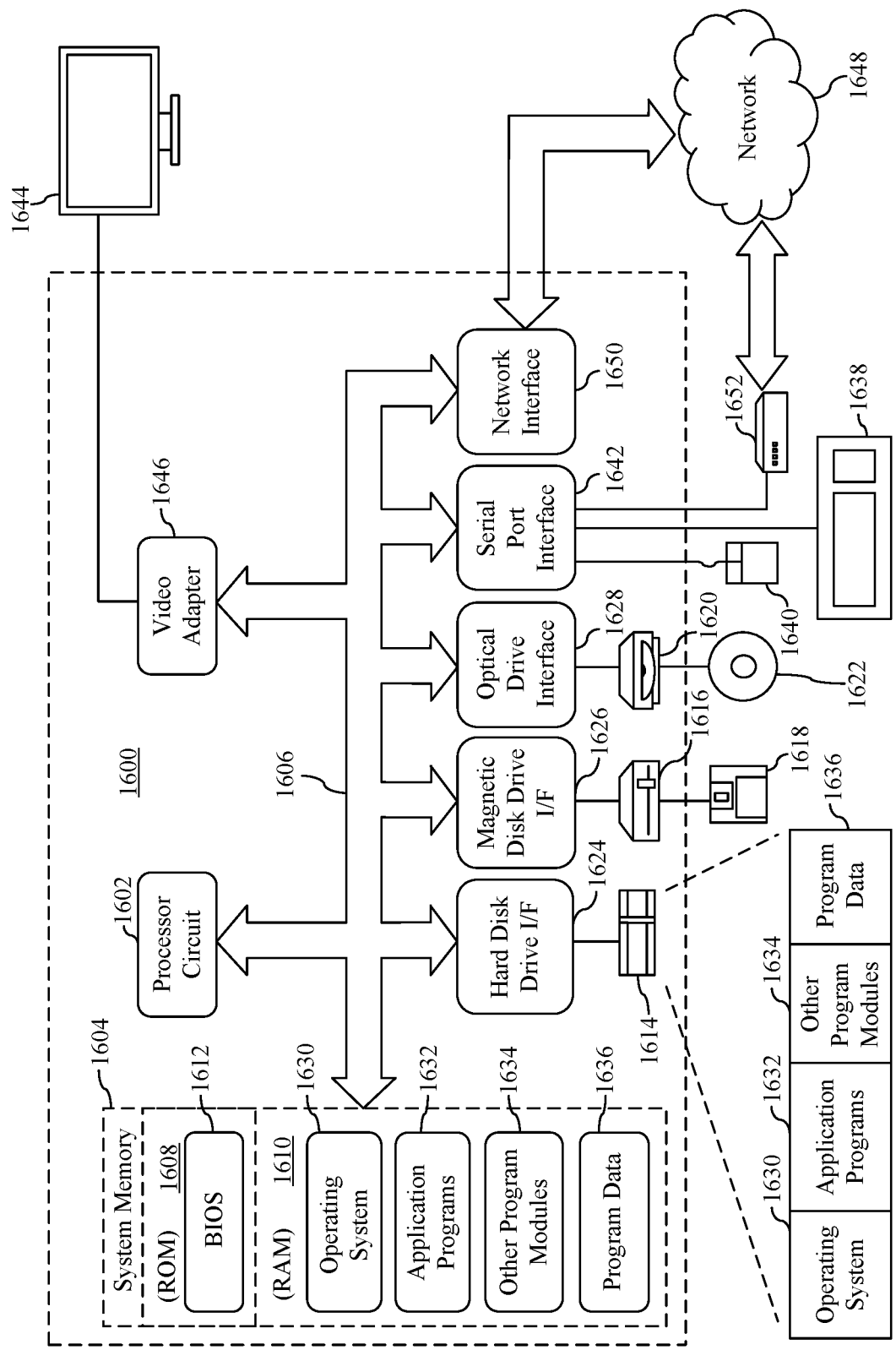
FIG. 16 is a block diagram of an example processor-based computer system that may be used to implement various embodiments.

FIG. 16 is a block diagram of an example processor-based computer system that may be used to implement various embodiments. Computing devices 102, 104, and 502 may each include any type of computing device, mobile or stationary, such as a desktop computer, a server, a video game console, etc. For example, any of computing devices 102, 104, and 502 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

FIG. 16 depicts an exemplary implementation of a computing device 1600 in which embodiments may be implemented. For example, computing device 102, computing device 104, and computing device 502 may each be implemented in one or more computing devices similar to computing device 1600 in stationary or mobile computer embodiments, including one or more features of computing device 1600 and/or alternative features. The description of computing device 1600 provided herein is provided for purposes of illustration, and is not intended to be limiting. Embodiments may be implemented in further types of computer systems, as would be known to persons skilled in the relevant art(s).

As shown in FIG. 16, computing device 1600 includes one or more processors, referred to as processor circuit 1602, a system memory 1604, and a bus 1606 that couples various system components including system memory 1604 to processor circuit 1602. Processor circuit 1602 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1602 may execute program code stored in a computer readable medium, such as program code of operating system 1630, application programs 1632, other programs 1634, etc. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random-access memory (RAM) 1610. A basic input/output system 1612 (BIOS) is stored in ROM 1608.

Computing device 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1630, one or more application programs 1632, other programs 1634, and program data 1636. Application programs 1632 or other programs 1634 may include, for example, computer program logic (e.g., computer program code or instructions) for implementing computing device 102, user device 104, computing device 502, feature set extractor 210, application description determiner 212, category predictor 214, trained machine learning model 106, confidence score generator 216, access request handler 110, category determiner 220, access restrictions determiner 224, time usage manager 226, access arbiter 222, memory 230, web service 240, display screen 256, execution engine 250, application 114, application access manager 112, user interface 254, metadata acquisition manager 504, data preprocessing engine 506, language translator 520, text denoise engine 522, lemmatization engine 524, feature engineering engine 503, text vectorization engine 526, image processing engine 527, machine learning model builder 510, classic machine learning model 528, deep learning model 530, model evaluation processor 512, model metrics generator 532, flowchart 3, flowchart 4, flowcharts 6-15, and/or further embodiments described herein. The program data 1636 may include application metadata 260, category data structure 108, access restriction settings 234, accumulated time usage 236, family account settings 238, and/or further embodiments described herein A user may enter commands and information into computing device 1600 through input devices such as keyboard 1638 and pointing device 1640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1602 through a serial port interface 1642 that is coupled to bus 1606, but may be connected by other interfaces, such as a parallel port, game port, or a universal serial bus (USB).

A display screen 1644 is also connected to bus 1606 via an interface, such as a video adapter 1646. Display screen 1644 may be external to, or incorporated in computing device 1600. Display screen 1644 may display information, as well as being a user interface for receiving user commands and/or other information (e.g., by touch, finger gestures, virtual keyboard, etc.). In addition to display screen 1644, computing device 1600 may include other peripheral output devices (not shown) such as speakers and printers.

Computing device 1600 is connected to a network 1648 (e.g., the Internet) through an adaptor or network interface 1650, a modem 1652, or other means for establishing communications over the network. Modem 1652, which may be internal or external, may be connected to bus 1606 via serial port interface 1642, as shown in FIG. 16, or may be connected to bus 1606 using another interface type, including a parallel interface.

As used herein, the terms "computer program medium," "computer-readable medium," and "computer-readable storage medium" are used to refer to physical hardware media such as the hard disk associated with hard disk drive 1614, removable magnetic disk 1618, removable optical disk 1622, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1632 and other programs 1634) may be stored on the hard disk, magnetic disk, optical disk, ROM, RAM, or other hardware storage medium. Such computer programs may also be received via network interface 1650, serial port interface 1642, or any other interface type. Such computer programs, when executed or loaded by an application, enable computing device 1600 to implement features of embodiments discussed herein. Accordingly, such computer programs represent controllers of the computing device 1600.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system implemented in a computing device comprises: a feature set extractor configured to identify at least one feature of an application; a category predictor comprising a trained machine learning model, the category predictor configured to: generate, by the trained machine learning model, a category of the application based on the at least one feature of the application; and indicate the generated category in a data structure that indicates application categories; an access request handler comprising: an access arbiter configured to receive a request related to access to the application by the specified user; a category determiner configured to determine the category of the application from the data structure; and a time usage manager configured to determine the available time usage corresponding to the category of the application for a specified user; and the access arbiter further configured to respond to the request with a determined available time usage corresponding to the category of the application for the specified user.

In an embodiment, the access request handler further comprises an access restrictions determiner configured to: determine, for the specified user, access restriction settings corresponding to the category of the application; and the time usage manager further configured to: determine, for the specified user, accumulated time usage corresponding to the category of the application, and determine, for the specified user, the available time usage corresponding to the category of the application based on the access restrictions settings and the accumulated time usage.

In an embodiment, the access request handler is further configured to: transmit the available time usage to a user device utilized by the specified user, wherein the device controls access to the application by the specified user based on the available time usage.

In an embodiment, the access request handler is further configured to: receive, from the user device, a time usage report associated with the specified user and the category; and determine the accumulated time usage based at least on the time usage report.

In an embodiment, the category predictor is further configured to: generate, by the trained machine learning model, a confidence score for the category of the application; retrain the model; and generate, by the retrained model, an updated category for the application in response to the confidence score having a predetermined relationship with a threshold.

In an embodiment, the category predictor is further configured to: generate, by the trained machine learning model, a plurality of categories and confidence scores based on a features associated with a plurality of applications; and associate each of the plurality of applications in the data structure with a corresponding category and a confidence score of the plurality of categories.

In an embodiment, the accumulated time usage corresponding to the category is associated with a plurality of user devices utilized by the specified user.

In an embodiment, the feature set extractor further comprises: an application description determiner configured to automatically determine a description of the application by issuing one or more API (application programming interface) calls.

In an embodiment, the feature set extractor further comprises: an application description determiner configured to automatically retrieve a description of the application from a knowledge graph web service.

In another embodiment, a method in a computing device comprises: identifying at least one feature of an application; generating, by a trained machine learning model, a category of the application based on the at least one feature of the application; and indicating the generated category in a data structure that indicates application categories.

In an embodiment, the method further comprises: generating, by the trained machine learning model, a confidence score for the category of the application; retraining the model; and generating, by the retrained model, an updated category for the application in response to the confidence score having a predetermined relationship with a threshold.

In an embodiment, the method further comprises: generating, by the trained machine learning model, a plurality of categories and confidence scores based on feature sets associated with a plurality of applications; and associating each of the plurality of applications in the data structure with a corresponding category and a confidence score of the plurality of categories.

In an embodiment, the identifying at least one feature of an application comprises: automatically determining a description of the application by issuing one or more API (application programming interface) calls.

In an embodiment, the identifying at least one feature of an application comprises: automatically retrieving a description of the application from a knowledge graph webservice.

In another embodiment, a method in a computing device comprises: receiving a request related to access to an application by a specified user; determining a category of the application from a data structure generated, by a trained machine learning model, to list applications and corresponding categories; determining an available time usage corresponding to the category of the application for the specified user; and responding to the request with the determined available time usage.

In an embodiment, the determining an available time usage corresponding to the category of the application for the specified user comprises: determining, for the specified user, access restriction settings corresponding to the category of the application, determining, for the specified user, accumulated time usage corresponding to the category of the application, and determining, for the specified user, the available time usage corresponding to the category of the application based on the access restrictions settings and the accumulated time usage.

In an embodiment, the responding comprises: transmitting the available time usage to a user device utilized by the specified user, wherein the user device controls access to the application by the specified user based on the available time usage.

In an embodiment, the method further comprises: receiving, from the user device, a time usage report associated with the specified user and the category; and wherein said determining, for the specified user, the accumulated time usage corresponding to the category of the application comprises: determining the accumulated time usage based at least on the time usage report.

In an embodiment, the accumulated time usage corresponding to the category is associated with a plurality of user devices utilized by the specified user.

In an embodiment, the specified user is a non-administrative user included in a family account.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system, implemented in a computing device, to train a machine learning model utilized to determine a category of an application, the system comprising:
   a processor;
   a memory device storing program code for execution by the processor, the program code including:
      a metadata acquisition manager that collects application metadata of a plurality of applications, wherein the application metadata includes application category information that corresponds to an application of the plurality of applications;

a feature engineering engine that determines training data suitable for training an untrained machine learning model based on the application metadata; and a machine learning model builder that trains the untrained machine learning model based on the training data to generate a trained machine learning model that predicts a category of an application without a known category.

2. The system of claim 1, wherein the application metadata of the plurality of applications comprises a description of at least one application of the plurality of applications.

3. The system of claim 1, wherein the trained machine learning model determines a category of the application without the known category based on a description of the application without the known category.

4. The system of claim 1, wherein the application metadata includes one or more of an application name, an application identifier, an application description, an application category, an application publisher, an application size, an application usage time, or an image that corresponds to an application of the plurality of applications.

5. The system of claim 1, further comprising an application description determiner that automatically accesses a knowledge graph web service and retrieves an application description for the collecting of application metadata for at least one of the plurality of applications.

6. The system of claim 1, wherein the untrained machine learning model is a classic machine learning model or a deep learning model.

7. The system of claim 1, wherein the machine learning model builder retrains the trained machine learning model based on:

metadata associated with additional applications relative to the plurality of applications;

metadata based on additional application information for the plurality of applications; or metadata based on different application information for the plurality of applications.

8. The system of claim 1, further comprising a category predictor that:

predicts a category for the application without the known category based on the trained machine learning model; and generates a confidence score for the prediction of the category.

9. The system of claim 8, wherein the category predictor generates an updated category for the application without the known category based on a retrained machine learning model in response to the confidence score having a predetermined relationship with a threshold.

10. A method, implemented in a computing device, to train a machine learning model utilized to determine a category of an application, the method comprising:

collecting application metadata of a plurality of applications, wherein the application metadata includes application category information that corresponds to an application of the plurality of applications;

determining training data suitable for training an untrained machine learning model based on the application metadata; and training the untrained machine learning model based on the training data to generate a trained machine learning model that predicts a category of an application without a known category.

11. The method of claim 10, wherein the application metadata of the plurality of applications comprises a description of at least one application of the plurality of applications.

12. The method of claim 10, wherein the trained machine learning model determines a category of the application without the known category based on a description of the application without the known category.

13. The method of claim 10, wherein the application metadata includes one or more of an application name, an application identifier, an application description, an application category, an application publisher, an application size, an application usage time, or an image that corresponds to an application of the plurality of applications.

14. The method of claim 10, further comprising automatically accessing a knowledge graph web service and retrieving an application description for the collecting of application metadata for at least one of the plurality of applications.

15. The method of claim 10, wherein the untrained machine learning model is a classic machine learning model or a deep learning model.

16. The method of claim 10, wherein the machine learning model builder retrains the trained machine learning model based on:

metadata associated with additional applications relative to the plurality of applications;

metadata based on additional application information for the plurality of applications; or metadata based on different application information for the plurality of applications.

17. The method of claim 10, further comprising:

predicting a category for the application without the known category based on the trained machine learning model; and generating a confidence score for the prediction of the category.

18. The method of claim 17, wherein the category predictor generates an updated category for the application without the known category based on a retrained machine learning model in response to the confidence score having a predetermined relationship with a threshold.

19. A computer-readable medium having program code recorded thereon that when executed by a processor causes the processor to perform a method for train a machine learning model utilized to determine a category of an application, the method comprising:

collecting application metadata of a plurality of applications, wherein the application metadata includes application category information that corresponds to an application of the plurality of applications;

determining training data suitable for training an untrained machine learning model based on the application metadata; and training the untrained machine learning model based on the training data to generate a trained machine learning model that predicts a category of an application without a known category.

20. The computer-readable medium of claim 19, wherein the application metadata of the plurality of applications comprises a description of at least one application of the plurality of applications.

* * * * *